2,947,779

PROCESS FOR THE ESTERIFICATION OF UNSATURATED ACIDS

James D. Idol, Jr., Shaker Heights, Robert W. Foreman, Cleveland, and Franklin Veatch, Lyndhurst, Ohio, assignors to The Standard Oil Company, Cleveland, Ohio, a corporation of Ohio No Drawing. Filed Dec. 31, 1957, Ser. No. 706,253

7 Claims. (Cl. 260—486)

The present invention relates to a process for the manufacture of the lower alkyl esters of unsaturated aliphatic acids. More particularly, the invention deals with the preparation of the alkyl esters of α-β unsaturated carboxylic acids such as acrylic and methacrylic acid by a vapor phase esterification reaction utilizing a silica gel catalyst.

Alkyl esters of unsaturated acids are employed in the preparation of many plastic compositions and the demand for these esters has been steadily increasing. Certain unsaturated esters such as ethyl acrylate and methyl methacrylate move in large volumes in commerce.

One of the methods proposed by the prior art for the preparation of esters involves the vapor phase esterification of an acid with the desired alcohol. The prior art suggests that the yield of such reactions may be improved by removing the water produced in the reaction in accordance with the familiar laws of chemical equilibrium. We have now discovered that, contrary to the suggestions of the prior art, the yield of certain vapor phase esterification reactions using silica gel as a catalyst may actually be improved by adding water to the reaction. The magnitude of the improvement is such that the process has become commercially attractive.

The improvements obtained by the method of this invention are quite surprising and no theory has been developed to adequately explain the phenomena involved. Nevertheless, our data clearly show that improvements in the yield of the reaction do result from the method of this invention; and, consequently, the theory which explains this improvement is deemed unimportant.

This invention is principally directed to the esterification of acrylic and methacrylic acids but other lower α-β unsaturated aliphatic acids may also be employed. Similarly, any of the lower aliphatic alcohols may be employed in the process of this invention; for example, methanol, ethanol, butanol-1, 2-ethylhexanol and the like. By "lower" is meant a compound having not more than 8 carbon atoms.

The process is conducted in conventional equipment and there are many kinds of equipment available for esterification reactions. A particularly suitable piece of equipment is a vertical vessel containing a fixed catalyst bed. The reactants may be introduced to such a vessel at the bottom and the product removed overhead, or vice versa. Alternatively the vessel may be positioned horizontally and the reactants introduced at one end and the products withdrawn from the other end.

It is contemplated within the scope of this invention that the reactants may be pre-heated to the reaction temperature prior to their contact with the catalyst in the reaction vessel, and it is also contemplated that heat may be transferred to or from the reaction vessel during the operation of the process.

As stated above, the process of the present invention is carried out in the presence of silica gel which serves as a catalyst for the reaction. The size of the silica gel particles in the bed is not critical and any convenient size may be employed. A particle size range of 28 to 200 mesh has been found to be entirely satisfactory.

The process of this invention is conducted in the vapor phase and any temperature above the boiling point of the reactants and the products may be employed. Since water is a product this sets the lower temperature limit at above 212° F. In general, the temperature range preferably is 350 to 750° F. In the case of ethyl acrylate it is desirable to operate in the range of 450 to 600 with an optimum at about 550° F. The only precaution that must be observed is that the reaction must be conducted below the decomposition temperatures of the material. It is also preferred to operate at atmospheric pressure since there appears to be no advantage to high pressure operation. In fact, the tendency of the reactants and products to polymerize under the influence of pressure militates against the use of high pressure.

In general, the reaction requires relatively long contact times. The contact time is determined by dividing the apparent volume of catalyst in the esterification reactor by the actual volume of material fed to the column per unit time at the reaction conditions. In general, it may be stated that contact times in the range of 15 to 120 seconds are suitable, and we prefer to employ a contact time of at least 20 seconds since the conversion falls off rapidly as the contact time is decreased below 20 seconds. Longer times seem not to increase the conversion but do no harm. In the case where ethyl acrylate is the desired product, the contact time of approximately 60 to 80 seconds appears to give optimum conversion, but the throughput is lower for a given reactor and contact times of 25 to 35 seconds are optimum considering all factors.

The ratio of alcohol to acid in the feed to the reaction should in all cases be at least the stoichiometric ratio, and we prefer to employ a substantial excess of alcohol in the reaction mixture. A ratio of 8:1 gives a higher conversion than 1:1, but in the case of ethyl acrylate the ratio of ethyl alcohol to acrylic acid is preferably about 2:1 since the increase in conversion at higher ratios is offset by the cost of recovering and recycling the excess.

According to the process of our invention a substantial excess of water must be employed in the reaction mixture. As a practical matter, the ratio of water to acid should be in the range of 1:1 to 8:1, and in the case of ethyl acrylate we prefer to employ 4 mols of water per mol of acid in the reaction mixture.

The products of the esterification reaction are recovered by condensation of the gaseous reactor effluent and the ester is separated from the residual alcohol and acid by conventional means such as extractive distillation and vacuum distillation. The unconverted alcohol and acid which are recovered may be recycled to the reaction vessel.

Example I given below illustrates the preferred embodiment of our invention. In order to demonstrate the improvements obtained by our invention, an example also appears which is illustrative of the prior art methods of esterification in that no water is added to the reaction. In all of the examples the conversion data refers to the amount of acid converted to esters. The yield in all the examples is approximately 100% since the process is essentially free of undesired side reactions such as decomposition or polymerization.

In all of the examples given below an esterification reactor 2.5 inches in diameter and 14 inches high was employed. The silica gel in the reactor weighed 650 g. and had a particle size range of 28–200 and the catalyst bed had an apparent volume of 910 ml.

Example I

A mixture having the following composition was fed to the reactor at a temperature of 500° F. and at atmospheric pressure.

| Ingredient: | Mol percent |
|---|---|
| Acrylic acid | 14 |
| Water | 57 |
| Ethanol | 29 |

The contact time during the run was 25 seconds. It was determined that 58% of the acrylic acid fed to the reactor was converted to ethyl acrylate.

Example II

In another run a material having the following composition was fed to the reactor at a temperature of 500° F:

| Ingredient: | Mol percent |
|---|---|
| Acrylic acid | 33 |
| Ethanol | 67 |

The reactor was maintained at atmospheric pressure throughout the run and the contact time was 24 seconds. It was determined that only 45% of the acrylic acid fed to the reactor was converted to ethyl acrylate.

A comparison between Examples I and II clearly shows the advantages to be derived from the process of this invention. In Example I, which was carried out in accordance with the method of our invention, 58% of the acrylic acid was converted to ethyl acrylate. This is in sharp contrast to Example II which was carried out under almost identical conditions except that no added water was present in the reaction mixture. In the latter run only 45% of the acrylic acid was converted to ethyl acrylate. The conversion level was raised approximately 13% by the addition of water to the reactor which clearly demonstrates the improvement obtained by means of this invention.

Example III

In another run employing the process of this invention a material having the following composition was fed to the reactor at 500° F:

| Ingredient: | Mol percent |
|---|---|
| Methacrylic acid | 14 |
| Methanol | 29 |
| Water | 57 |

The reactor was maintained at atmospheric pressure and the contact time was 25 seconds. It was determined that during this run 79% of the methacrylic acid was converted to methyl methacrylate. A comparable run without water gave a much lower yield.

Example IV

Butyl acrylate was prepared according to the process of this invention from a feed material having the following composition:

| Ingredient: | Mol percent |
|---|---|
| Acrylic acid | 14 |
| Butanol-1 | 29 |
| Water | 57 |

This reactor was conducted at a temperature of 500° F. and at atmospheric pressure and the contact time was 25 seconds. It was determined that 39.7% of the acrylic acid was converted to butyl acrylate during this run. A comparable run in the absence of added water gave a significantly lower yield.

While the acid employed in the above examples was reasonably pure, this was done merely for experimental purposes and the process is applicable to crude acid mixtures. For example, if the acrylic acid is obtained by the oxidation of acrolein the acid introduced to the esterification reaction may contain varying quantities of acrolein. Fortuitously, minor amounts of materials such as acrolein do not adversely affect the reaction.

It will be obvious to those skilled in the art that various modifications of this invention can be made without departing from the spirit or scope of the invention. Accordingly, this application for Letters Patent is intended to cover all such modifications as would reasonably fall within the scope of the appended claims.

We claim:

1. A process for the production of unsaturated esters which comprises the step of contacting a gaseous mixture comprising an alkyl alcohol containing from 1 to 8 carbon atoms and an $\alpha,\beta$-unsaturated carboxylic acid selected from the group consisting of acrylic and methacrylic acids with silica gel at a temperature in the range between 212° F. and 750° F. in the presence of added water in an amount sufficient to provide a water-acid ratio in said mixture in the range of 1:1 to 8:1, said gaseous mixture having a molal ratio of alcohol to acid of at least 1.

2. A process for the production of unsaturated esters which comprises the step of contacting a gaseous mixture comprising an alkyl alcohol containing from 1 to 8 carbon atoms and an $\alpha,\beta$-unsaturated carboxylic acid selected from the group consisting of acrylic and methacrylic acids with silica gel at a temperature in the range between 350° F. and 750° F. in the presence of added water in an amount sufficient to provide a water-acid ratio in said mixture in the range of 1:1 to 8:1, said gaseous mixture having a molal ratio of alcohol to acid of at least 1.

3. A process for the production of ethyl acrylate which comprises the step of contacting a gaseous mixture comprising ethanol and acrylic acid with silica gel at an elevated temperature between 212° F. and 750° F. in the presence of added water in an amount sufficient to provide a water-acid ratio in said mixture in the range of 1:1 to 8:1, said gaseous mixture having a molal ratio of alcohol to acid of at least 1.

4. The process of claim 3 in which said elevated temperature is about 550° F.

5. A process for the production of methyl methacrylate which comprises the step of contacting a gaseous mixture comprising methanol and methacrylic acid with silica gel at an elevated temperature in the range between 212° F. and 750° F. in the presence of added water in an amount sufficient to provide a water-acid ratio in said mixture in the range of 1:1 to 8:1, said gaseous mixture having a molal ratio of alcohol to acid of at least 1.

6. A process for the production of butyl acrylate which comprises the step of contacting a gaseous mixture comprising butanol-1 and acrylic acid with silica gel at an elevated temperature in the range between 212° F. and 750° F. in the presence of added water in an amount sufficient to provide a water-acid ratio in said mixture in the range of 1:1 to 8:1, said gaseous mixture having a molal ratio of alcohol to acid of at least 1.

7. A process for the production of 2-ethylhexyl acrylate which comprises the step of contacting a gaseous mixture comprising 2-ethylhexanol and acrylic acid with silica gel at an elevated temperature in the range between 212° F. and 750° F. in the presence of added water in an amount sufficient to provide a water-acid ratio in said mixture in the range of 1:1 to 8:1, said gaseous mixture having a molal ratio of alcohol to acid of at least 1.

References Cited in the file of this patent

UNITED STATES PATENTS

| 2,184,934 | Bruson et al. | Dec. 26, 1939 |
| 2,411,136 | Luce | Nov. 12, 1946 |
| 2,464,768 | Redmon et al. | Mar. 15, 1949 |
| 2,644,839 | Zettlemoyer et al. | July 7, 1953 |

OTHER REFERENCES

Tidwell et al.: J. Am. Chem. Soc. 53, 4353–8 (1931).
Bartell et al.: J. Phys. Chem. 36, 475–489 (1932).